(12) United States Patent
Lipniarski (10) Patent No.: US 7,578,632 B2
(45) Date of Patent: Aug. 25, 2009

(54) SECURE INTERLOCKING SYSTEM FOR PLASTIC MATERIALS

(75) Inventor: David J. Lipniarski, North Tonawanda, NY (US)

(73) Assignee: Confer Plastics, Inc., North Tonawanda, NY (US)

( * ) Notice: Subject to any disclaimer, the term of this patent is extended or adjusted under 35 U.S.C. 154(b) by 243 days.

(21) Appl. No.: 11/800,852

(22) Filed: May 8, 2007

(65) Prior Publication Data

US 2008/0279624 A1    Nov. 13, 2008

(51) Int. Cl.
*F16D 1/072*    (2006.01)
(52) U.S. Cl. .................... 403/282; 403/242; 403/244; 182/228.1
(58) Field of Classification Search ............... 403/242, 403/244, 274, 282, 382; 182/228.1, 228.3, 182/228.4, 228.6
See application file for complete search history.

(56) References Cited

U.S. PATENT DOCUMENTS

| 2,550,274 | A | * | 4/1951 | Kuhler | 182/228.1 |
| 3,591,213 | A | * | 7/1971 | Turner | 182/228.1 |
| 3,765,137 | A | * | 10/1973 | Loix | 182/228.1 |
| 3,970,400 | A | * | 7/1976 | Reid | 403/242 |
| 4,079,564 | A | * | 3/1978 | Ollinger et al. | 403/244 |
| 4,356,888 | A | * | 11/1982 | Steenberg | 182/228.1 |

* cited by examiner

*Primary Examiner*—Michael P Ferguson
(74) *Attorney, Agent, or Firm*—Roach Brown McCarthy & Gruber, P.C.; Kevin D. McCarthy (57) ABSTRACT

A first plastic component and a second plastic component are joined together by an expansive joint system on the first plastic component and a driving joint system on the second plastic component. The expansive joint system has two expansive units while the driving joint system has corresponding driving units. When the driving units simultaneously expand the respective expansive units to a predetermined point, the expansive units contract to their original position and securely lock onto portions of the second plastic component.

14 Claims, 5 Drawing Sheets

SECURE INTERLOCKING SYSTEM FOR PLASTIC MATERIALS

FIELD OF THE INVENTION

The present invention is directed toward an interlocking mechanism for plastic materials.

BACKGROUND OF THE INVENTION

Confer Plastics, Inc., the assignee, has been manufacturing plastic products for more than 30 years. It has obtained a few patents directed to how to interconnect plastic materials together. One of those patents is U.S. Pat. No. 6,190,600. In view of Confer's experience in the plastic industry and obtaining patents, Confer is familiar with various methods to interconnect plastic pieces together.

The conventional method to interconnect plastic pieces together is to have a tongue and groove system with an additional interlocking device. That additional interlocking device includes screws. Screws and conventional metallic interconnecting components however deteriorate the integrity of the plastic material. As such screws and other metallic interconnecting components are to be avoided as the additional interlocking device.

To address that problem, the additional interlocking device has included an additional male component interlocking with an additional female component wherein the male component is incorporated in the original tongue system and the additional female component is incorporated in the original groove system.

Figure 1:
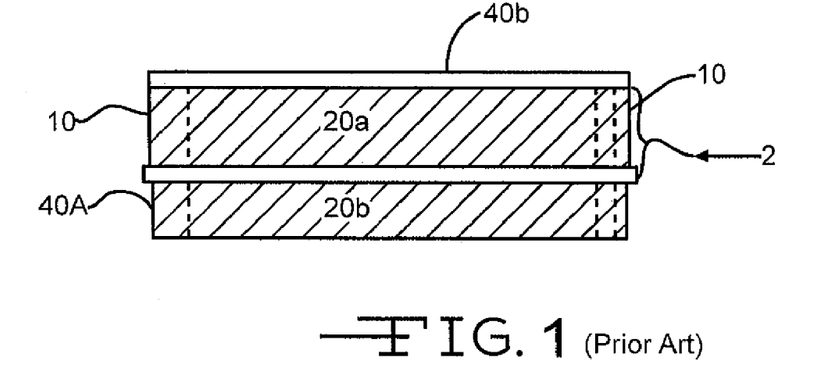
FIG. 1 illustrates a front view of a prior art step ladder side walls (illustrated by solid and dashed lines), steps and base boards.
Figure 2:
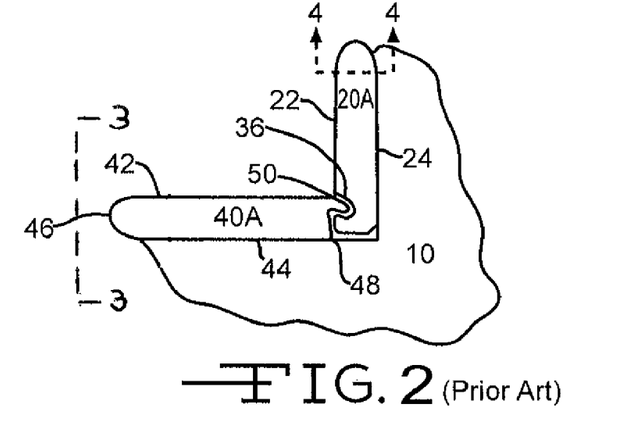
FIG. 2 illustrates a side view of FIG. 1 taken from arrow 2.
Figure 3:
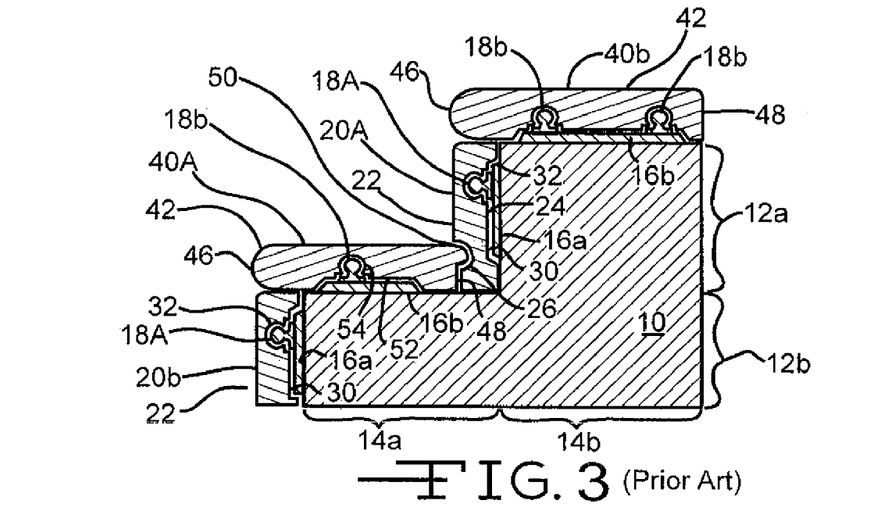
FIG. 3 illustrates a view of FIG. 1 taken along the lines 3-3.
Figure 4:
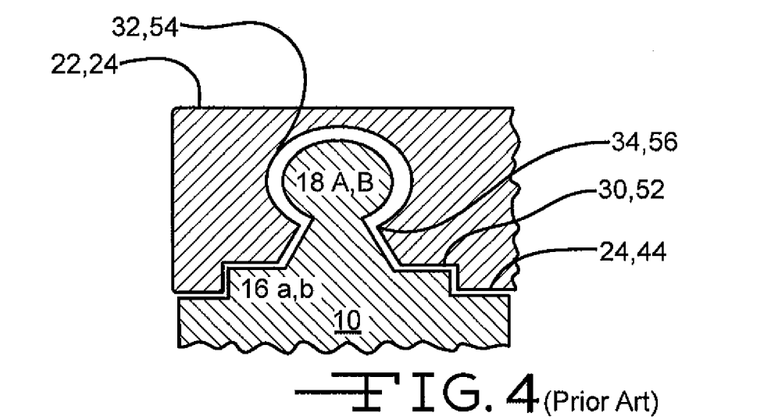
FIG. 4 illustrates a cross-sectional view of FIG. 2 taken along the lines 4-4 or lines 5-5.

An example of the tongue and groove system with additional male and female components is found in Confer Plastics' Leisure Accents step ladder. The Leisure Accents step ladder, as illustrated in FIGS. 1 to 4, has at least two identical side walls 10 (two are illustrated by broken lines in FIG. 1 and one is shown in FIGS. 2, 3, and 4), a interconnect base board 20a, a terminal base board 20b (see FIGS. 1, 2, and 3), an interlocking step 40a and a terminal step 40b (shown at FIGS. 3 and 4). Each side step side wall 10 has a first riser section 12a for the interconnect base board 20a, a second riser section 12b for the terminal base board 20b, a first tread section 14a for the interlocking step 40a, and a second tread section 14b for the terminal step 40b. Each riser section 12 has a tongue section 16a and each tread section 14 also has a tongue section 16b. The tongue section 16a, 16b extends the length or at least the majority of the length of the respective section. At a predetermined position (can be a different position for each riser section 12 and tread section 14) on the tongue section 16a has at least one male component 18a, and the tongue section 16b has at least one male component 18b. The male component 18a,b is hour glassed shape or variations thereof as illustrated in FIGS. 2 and 3.

Each base board 20 has an exposed surface 22, an opposite surface 24, a proximal end 26 (closest to the ground) and a distal end 28. As illustrated in FIG. 3, the base board's 20 opposite surface 24 has a groove section 30 and a female component 32 that respectively receive the riser's tongue section 16a and male component 18a. In particular the female component 32 has a rib area 34 that conforms to the narrow section of the male component's 18a hour-glass shaped area. As illustrated at FIG. 2, the exposed surface 22 on the interconnect base board 20a has a notch 36 that extends adjacent and parallel to the base board's 20 proximal end 26 length.

The step 40 has, as illustrated at FIGS. 2, 3, and 4, a stepped on surface 42, an opposite surface 44, an exposed end 46 and an unexposed end 48. At the unexposed end 48 on the interlocking step 40a is a protrusion 50. The notch 36 receives the protrusion 50.

Reverting to FIGS. 3 and/or 4, the step 40 on the opposite surface 44 has a groove section 52 and a female component 54 that respectively receive the riser's tongue section 16b and male component 18b. In particular the female component 54 has a rib area 56 that conforms to the narrow section of the male component's 18b hour-glass shaped area.

The base board 20 is installed onto the side wall 10 first by applying a force over the base board's female component 32 so the female component 32 receives the male component 18a. The protrusion 50 is then inserted into the notch 36 to ensure the proper alignment between (a) the base board and the step and (b) the step and the riser. Once the step is properly aligned, a force is applied to the step's female component 54 to receive the male component 18b.

A problem with the current Leisure Accents step ladder is the step can be displaced when excess weight is applied to the steps. In particular when excess and abnormal pressure is applied to the step's exposed end 46, the step could be dislodged. This is a problem to be avoided.

SUMMARY OF THE INVENTION

A first plastic component and a second plastic component are joined together by an expansive joint system on the first plastic component and a driving joint system on the second plastic component. The expansive joint system has two expansive units while the driving joint system has corresponding driving units. When the driving units simultaneously expand the respective expansive units to a predetermined point, the expansive units contract to their original position and securely lock onto portions of the second plastic component.

DETAILED DESCRIPTION OF THE PREFERRED EMBODIMENTS

The present invention is directed to a secure interconnection between two plastic blow-molded unitary components. To understand the nuances of this invention we will first describe each element illustrated in FIGS. 5 to 13.

Figure 5:
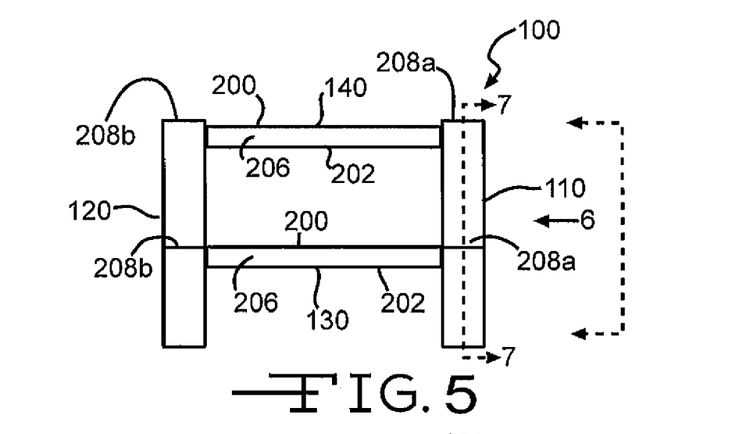
FIG. 5 illustrates a front view of the current invention's side walls and steps.

FIG. 5 illustrates front side view of an open step ladder system 100. The open step ladder system 100 has a first side wall 110, a second side wall 120, a first step 130 and a second step 140. The first side wall 110 and the second side wall 120 are identical. Likewise, the first step 130 and the second step 140 are identical. The side walls and the steps are blow-molded plastic materials and each component is a single unitary device.

Side Wall

Figure 6:
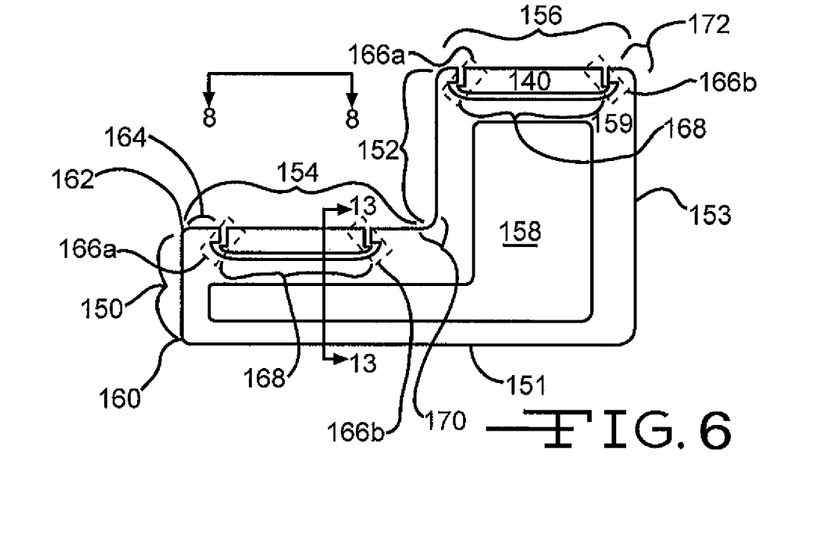
FIG. 6 illustrates a view of FIG. 5 taken along the lines 6-6.
Figure 7:
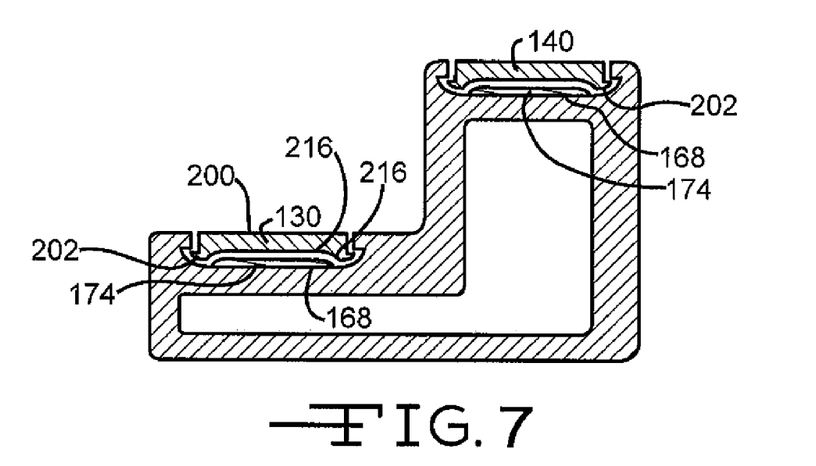
FIG. 7 illustrates a view of FIG. 5 taken along the lines 7-7.
Figure 8:
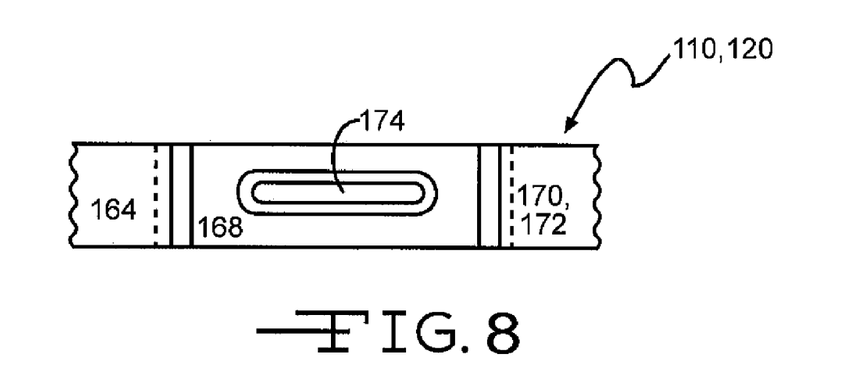
FIG. 8 illustrates a view of the FIG. 6 taken along the lines 8-8 without the step.
Figure 9:
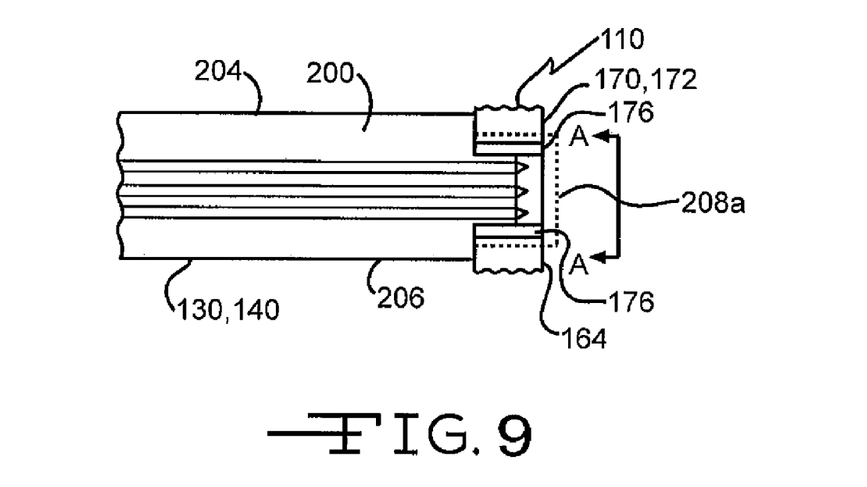
FIG. 9 illustrates a view of FIG. 6 taken along the lines 8-8 with a portion of the step.

FIG. 6 illustrates a side view of FIG. 5 taken along the lines 6-6. In FIG. 6, each side wall 110, 120 is illustrated having a first riser 150, a second riser 152, a first tread 154, a second tread 156, a narrow section 158, a wide section 159, a base 151, and a back support 153.

A. Riser Area

Each riser 150, 152 have defined areas. Those defined areas are the proximal end 160—the area closest to the ground—and the distal end 162—the area furthest from the ground. The risers 150, 152 illustrated in FIG. 5 to 13 are in the open step ladder embodiment. Moreover, the risers are shaped in a conventional riser manner. In the open step ladder embodiment illustrated in FIGS. 5 to 13, the risers 150, 152 have no grooves, tongues, male components, or female components.

B. Tread Area

Each tread area 154, 156 have defined areas as well. The areas illustrated in FIG. 6 are a first transition area 164, a first locking area 166a, a step receiving area 168, a second locking area 166b, and a second transition area 170 or a termination area 172 The termination area 172 is the location wherein there are no further risers to go up. Looking at FIGS. 7 (a cross section of FIG. 5 taken along the lines 7-7) and 8 (a top view of FIG. 6 along the lines 8-8 without the step), each tread area 154, 156 has a protuberance guide area 174 that extends from portions of the step receiving area 168.

Figure 10:
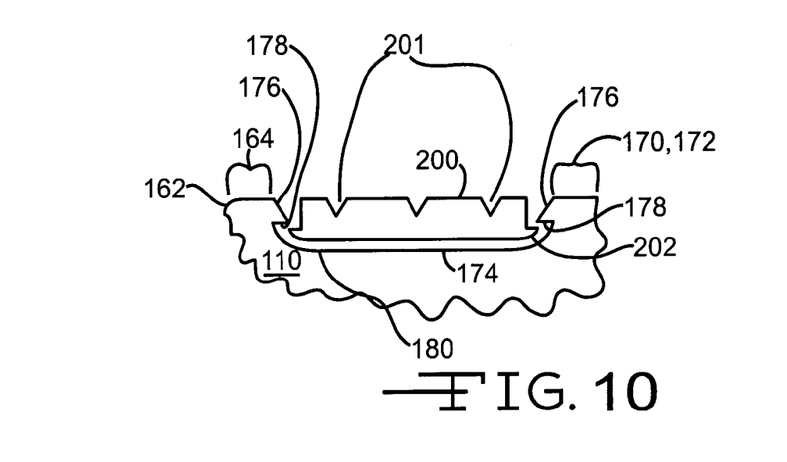
FIG. 10 illustrates a view of FIG. 9 taken along lines A-A.

The locking areas 166a,b have distinct areas. Those areas include an expansion angled lip 176, a locking upper lip 178 and a receiving lip 180. Those areas are best illustrated in FIG. 10.

Step

FIGS. 5, 6, 7, 9, 10, 11, 12, and 13 illustrate the steps 130, 140 from different angles and perspectives. The steps 130, 140 each have distinct areas. Those areas are a top surface 200, a bottom surface 202, a back section 204 (area closest to the side wall's back support 153), a front section 206 (best seen at FIGS. 5, 9, 10, and 11), a first interconnect area 208a (see FIGS. 9, 10 and 11), a second interconnect area 208b (only shown at FIG. 5) and a channel area 216 (shown at FIGS. 7, 12 and 13). First interconnect area 208a and second interconnect area 208b are identical and are the areas that interconnect to the respective side walls—first interconnect area 208a mates with the first side wall 110 and the second interconnect area 208b mates with the second side wall 120. Please recall the first side wall 110 and the second side wall 120 are identical. Likewise, the first step 130 and the second step 140 are identical.

Figure 11:
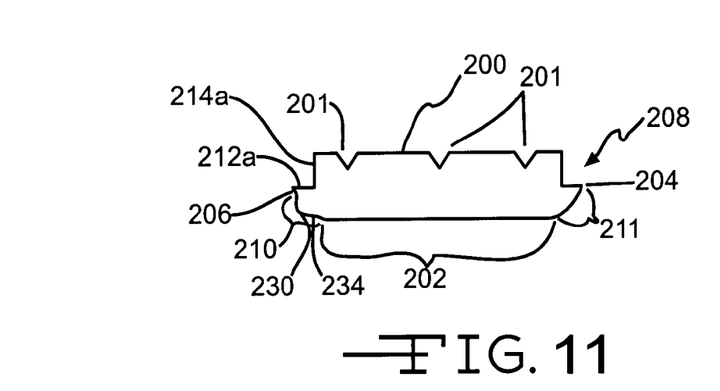
FIG. 11 illustrates FIG. 10 without the side wall.
Figure 12:
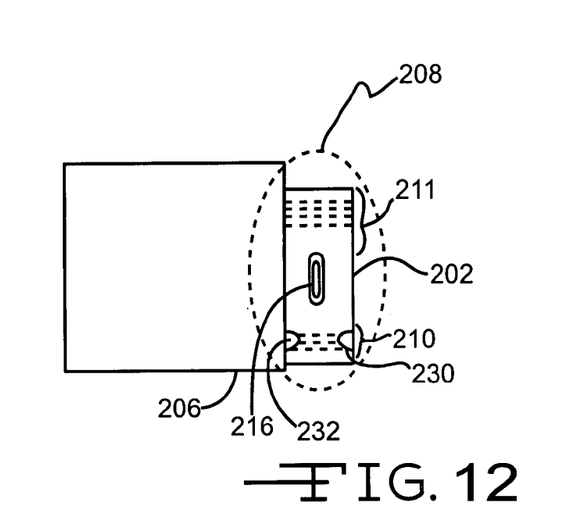
FIG. 12 illustrates FIG. 9 without the side wall.

As illustrated in greater detail at FIGS. 11 and 12, each interconnect area 208 has a first driving expansion area 210 positioned toward the front section 206, a second driving expansion area 211 positioned toward the back section 204, a first locking lower lip 212a, a second locking lower lip 212b, a first step receiving area 214a, and a second step receiving area 214b.

The first driving expansion area 210 has a first conical shaped area 230 separated from a second conical shaped area 232 by an angled sloped area 234. The first driving expansion area 210 extends from the bottom surface 202 to the first locking lower lip 212a—a middle level positioned immediately below the expansion angled lip 176—a third level—when the first interconnect area 208 connects to the first and second locking areas. The first locking lower lip is positioned at the middle level and positioned over portions of the first driving expansion area. The first step receiving area extends from the second locking lower lip to the top surface.

The second driving expansion area 211 has a convex surface that slopes from the bottom surface to the middle level. The second locking lower lip is positioned at the middle level and positioned over portions of the second driving expansion area. The second step receiving area extends from the second locking lower lip to the top surface.

The top section 200 can have furrows 201. The furrows increase friction to the steps and direct liquids off the top surface 200.

Combination of Step and Side Wall

Now that we identified the areas of the step ladder system 100, we can describe the system in greater detail.

Figure 13:
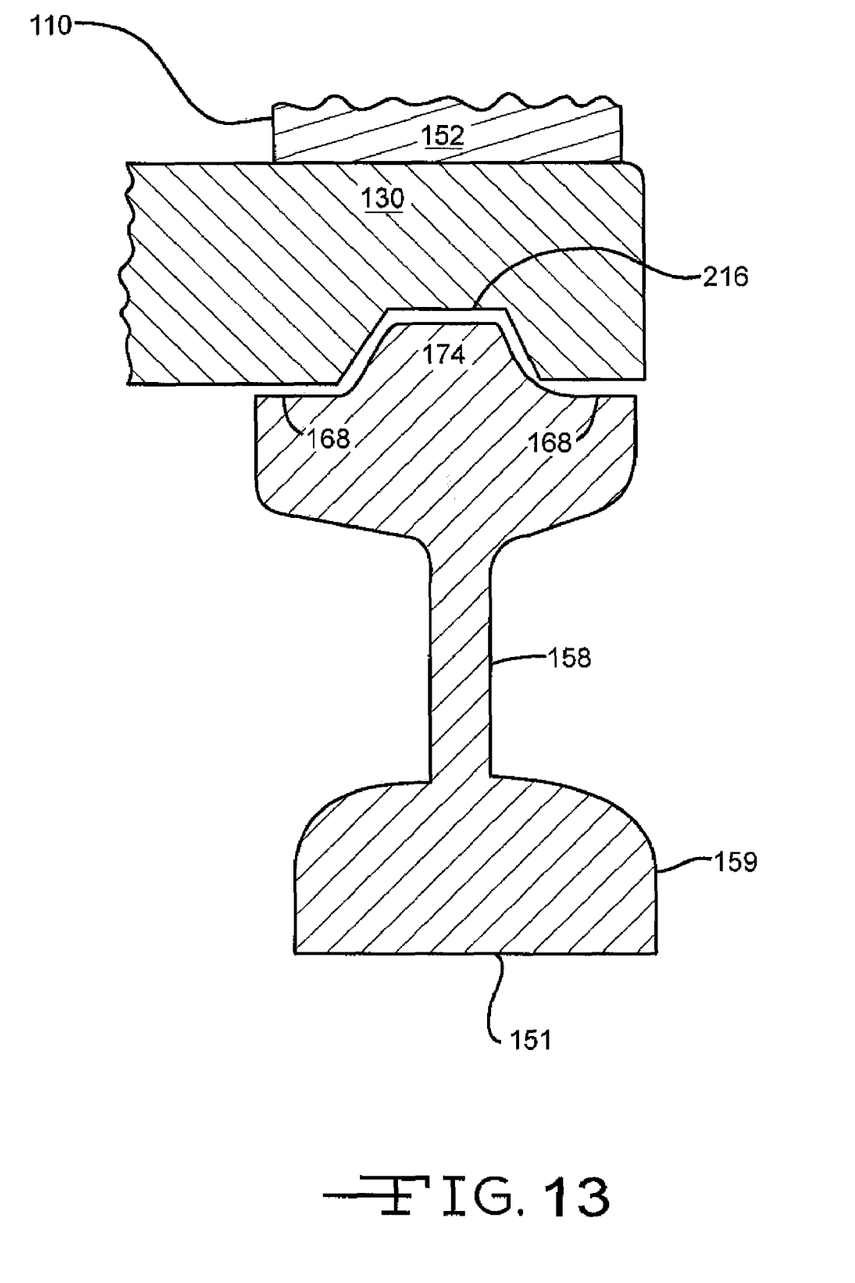
FIG. 13 illustrates a cross-section of FIG. 6 taken along the lines 13-13.

The side wall has the narrow section 158 and the wide section 159 as best illustrated at FIG. 13. The wide section is positioned at and near the perimeter of the side wall. The wide section 159 includes the areas commonly referred to as the first riser 150, the second riser 152, the first tread 154, the second tread 156, the base 151, and the back support 153. In particular, the wide section ranges from 0.25 to 3 inches wide, and 0.25 to 3 inches into the interior of the side wall from the perimeter. The remaining portion of the side wall is a narrow section 158 to save space and material.

When the step ladder 100 is used, the back support 153 contacts or is positioned near an object. The object is something or is a portion of something that is not within the normal reach of the user. As such the step ladder 100 is utilized. Likewise the base 151 is positioned against the ground, flooring and/or support near the object.

The user is expected to climb the step ladder 100 by positioning at least one of their feet on a step 120, 140. In some cases the user may even position one of their feet on the first transition area 164 and the second transition area 170.

The first transition area is positioned from the riser's distal end 162 to the tread area's first locking area 166a. In view of the cases that the user may use the first transition area, first transition area portions adjacent to the step 164a and the step's top surface 200 should be in approximately the same plane. At the same time, the first transition area closest to the riser 166b is equivalent to the step's front section 206. In particular the first transition area, closest to the riser and the step's front section, is convex shaped and slopes toward the ground. The sloped edge is commonly used to indicate to most users that the step area is terminating.

The second transition area is positioned from the riser's proximal end 160 to the tread area's second locking area 166b. The second transition area is a gradually concave-sloped section that transitions into the second riser section.

The second driving expansion area is applied through a force to the second expansion angled lip. When a force is applied to the second driving expansion area onto the second expansion angled lip, the second expansion angled lip uniformly moves away from the first wall. In contrast, when a force is applied to the first driving expansion area onto the first expansion angled lip, the first expansion angled lip that contacts the conical shaped areas of the first driving expansion area move further away from the second wall than the section of the first expansion angled lip that contacts the angled slope area—a non-uniform force. The non-uniform force application and the uniform force application are normally applied simultaneously to the side wall. Applying both types of forces simultaneously decreases the stress applied upon the side wall and the step. Decreasing the stress means there is a decreased chance of breaking the blow molded plastic material. This stress relief is necessary because when the two plastic materials are joined together it is almost impossible to separate the plastic materials without excessive force (sledge hammer or equivalent) which could damage the plastic materials.

As the expansion angled lip 176 contracts to and remains in its original position, the side wall's locking upper lip 178 is positioned over the step's locking lower lip 208. When the locking upper lip 178 is positioned over the step's locking lower lip 208, the step is unable to be removed from the side wall without excessive force. By excessive force, we mean a sledge hammer or equivalent thereof.

The step's locking lower lip 208 and the side wall's locking upper lip 178 are mirror images of each other. The step's locking lower lip 208 is a planar surface parallel to the top surface 200 that extends from the expansion area 206 in to the direction of the bottom surface 202.

Preferably when the locking upper lip 178 is positioned over the step's locking lower lip 208, the locking upper lip 178 contacts the step's receiving area. The step wall receiving area extends from the step's locking lower lip 208 to the top surface 200. The step's receiving area is positioned opposite the expansion angled lip 176 when the step is properly positioned in the side wall.

To ensure the step is properly positioned in the step wall, the step's channel area 216 is positioned over the protuberance guide area 174. The channel area 216 has a trapezoidal shape or equivalent thereof, the wider section of the channel area 216 is at the step's bottom surface while the narrower section is toward the top surface 200. These embodiments are clearly illustrated in FIGS. 12 and 13. The protuberance guide area 174 is inserted into the channel area 216 and therefore has the same or similar shape except it protrudes from the step receiving area 168.

Obviously, alternative embodiments of the protuberance guide area and groove can be utilized. For example, the step can have the protuberance guide area and the side wall have the channel area. Or the first side wall can have the channel area and the second side wall can have the protuberance guide area; and the step's first interconnect area can have a protuberance guide area and the second interconnect area can have the channel area.

Other Alternative Embodiments

The risers can be closed. By closed, we mean base boards, without notches, are attached to the risers in the same or similar manner as disclosed in Confer's Leisure Accents product and/or the present interconnection system.

While the present invention has been described and illustrated in conjunction with a number of specific embodiments, those skilled in the art will appreciate that variations and modifications may be made without departing from the principles of the invention as herein illustrated, described and claimed. The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

I claim:

1. A blow molded plastic interconnect apparatus comprising:
   A. a first plastic component having a first wall, a first locking area, a receiving area, a second locking area, a second wall;
      (a) the first wall, positioned at a first level, joins to the first locking area,
      (b) the first locking area joins to the receiving area, the receiving area is positioned at a second level wherein the first level and the second levels are at a different heights in relation to the ground,
      (c) the receiving area joins to the second locking area and
      (d) second locking area joins to the second wall, positioned at the first level, so the first wall, the first locking area, the receiving area, the second locking area and the second wall are one piece;
   the first locking area has (i) a first expansion angled lip sloped at an angle away from the first wall toward the second level and terminates at a third level, the third level is positioned between the first level and the second level, (ii) a first locking upper lip positioned (a) at the third level and (b) under the expansion angled lip and a portion of the first wall, and (iii) a first receiving lip having a concave surface that slopes to the receiving area;
   the second locking area has (i) a second expansion angled lip sloped at an angle away from the second wall toward the second level and terminates at the third level, the third level is positioned between the first level and the second level, (ii) a second locking upper lip positioned (a) at the third level and (b) under the second expansion angled lip and a portion of the second wall, and (iii) a second receiving lip having a concave surface that slopes to the receiving area;
   B. a second plastic component having a top surface, a bottom surface, a first connect area and a second connect area which are all one piece;
   the receiving area receives the bottom surface, the first locking area receives the first connect area and the second locking area receives the second connect area;
   the first connect area has a first driving expansion area having a first protruding conical shaped area separated from a second protruding conical shaped area by an angled sloped area, the first driving expansion area extends from the bottom surface to a middle level, the middle level is positioned immediately below the third level when the first connect area and the first locking area are joined together, a first locking lower lip positioned at the middle level and positioned over portions of the first driving expansion area, a first step receiving area extends from the second locking lower lip to the top surface;
   the second connect area has a second driving expansion area, the second driving expansion area has a convex surface that slopes from the bottom surface to the middle level, the middle level is positioned immediately below the third level when the second connect area and the second locking area are joined together, a second locking lower lip positioned at the middle level and positioned over portions of the second driving expansion area, a second step receiving area that extends from the second locking lower lip to the top surface;
   wherein the first plastic component and the second plastic component are combined together by (A) forcing (a) the second driving expansion area against the second expansion angled lip which forces the second expansion angled lip to uniformly move away from the first wall, (b) the first driving expansion area against the first expansion angled lip which forces the first expansion angled lip that contacts the protruding conical shaped areas to move further away from the second wall than the section of the first expansion angled lip that contacts the angled slope area, and (B) having the first expansion angled lip revert to its original position after the entire first driving expansion area passes the first expansion angled lip and the second expansion angled lip revert to its original position after the entire second driving expansion area passes the second expansion angled lip.

2. The blow molded plastic interconnect apparatus of claim 1 wherein the middle level contacts the third level.

3. The blow molded plastic interconnect apparatus of claim 1 wherein the first plastic component is a side wall for a step ladder and the second plastic component is a step for the step ladder.

4. The blow molded plastic interconnect apparatus of claim 3 further comprising a third plastic component that is identical to the first plastic component.

5. The blow molded plastic interconnect apparatus of claim 4 wherein the second plastic component has a third connect area and a fourth connect area wherein the top surface, the bottom surface, the first connect area, the second connect area, the third connect area and the fourth connect area are all one piece;
the third plastic component's receiving area receives the bottom surface, the third plastic component's first locking area receives the third connect area and the third plastic component's second locking area receives the fourth connect area;
the third connect area has a third driving expansion area having a third protruding conical shaped area separated from a fourth protruding conical shaped area by a second angled sloped area, the third driving expansion area extends from the bottom surface to the middle level, the middle level is positioned immediately below the third level when the third connect area and the third plastic component's first locking area are joined together, a third locking lower lip positioned at the middle level and positioned over portions of the third driving expansion area, a third step receiving area that extends from the third locking lower lip to the top surface;
the fourth connect area has a fourth driving expansion area, the fourth driving expansion area has a convex surface that slopes from the bottom surface to the middle level, the middle level is positioned immediately below the third level when the fourth connect area and the third plastic component's second locking area are joined together, a fourth locking lower lip positioned at the middle level and positioned over portions of the fourth driving expansion area, a fourth step receiving area that extends from the fourth locking lower lip to the top surface.

6. The blow molded plastic interconnect apparatus of claim 1 wherein the receiving area has a protuberance guide area and the bottom surface has a channel area wherein the channel area receives the protuberance guide area to ensure the first plastic component and the second plastic component are properly aligned.

7. The blow molded plastic interconnect apparatus of claim 1 wherein the top surface has furrows.

8. A blow molded plastic interconnect apparatus comprising:
A. a first plastic component having a first wall, a first locking area, a receiving area, a second locking area, a second wall;
(a) the first wall, positioned at a first level, joins to the first locking area,
(b) the first locking area joins to the receiving area, the receiving area is positioned at a second level wherein the first level and the second levels are at different heights in relation to the ground,
(c) the receiving area joins to the second locking area and
(d) second locking area joins to the second wall, positioned at the first level, so the first wall, the first locking area, the receiving area, the second locking area and the second wall are one piece;
the first locking area has (i) a first expansion angled lip sloped at an angle away from the first wall toward the second level and terminates at a third level, the third level is positioned between the first level and the second level, (ii) a first locking upper lip positioned (a) at the third level and (b) under the expansion angled lip and a portion of the first wall, and (iii) a first receiving lip having a concave surface that slopes to the receiving area;
the second locking area has (i) a second expansion angled lip sloped at an angle away from the second wall toward the second level and terminates at the third level, the third level is positioned between the first level and the second level, (ii) a second locking upper lip positioned (a) at the third level and (b) under the second expansion angled lip and a portion of the second wall, and (iii) a second receiving lip having a concave surface that slopes to the receiving area;
B. a second plastic component having a top surface, a bottom surface, a first connect area and a second connect area which are all one piece;
the receiving area receives the bottom surface, the first locking area receives the first connect area and the second locking area receives the second connect area;
the first connect area has a first driving expansion area having a first protruding conical shaped area separated from a second protruding conical shaped area by an angled sloped area, the first driving expansion area extends from the bottom surface to a middle level, the middle level is positioned immediately below and contacts the third level when the first connect area and the first locking area are joined together, a first locking lower lip positioned at the middle level and positioned over portions of the first driving expansion area, a first step receiving area extends from the second locking lower lip to the top surface;
the second connect area has a second driving expansion area, the second driving expansion area has a convex surface that slopes from the bottom surface to the middle level, the middle level is positioned immediately below and contacts the third level when the second connect area and the second locking area are joined together, a second locking lower lip positioned at the middle level and positioned over portions of the second driving expansion area, a second step receiving area that extends from the second locking lower lip to the top surface;
wherein the first plastic component and the second plastic component are combined together by (A) forcing (a) the second driving expansion area against the second expansion angled lip which forces the second expansion angled lip to uniformly move away from the first wall, (b) the first driving expansion area against the first expansion angled lip which forces the first expansion angled lip that contacts the protruding conical shaped areas to move further away from the second wall than the section of the first expansion angled lip that contacts the angled slope area, and (B) having the first expansion angled lip revert to its original position after the entire first driving expansion area passes the first expansion angled lip and the second expansion angled lip revert to its original position after the entire second driving expansion area passes the second expansion angled lip.

9. The blow molded plastic interconnect apparatus of claim 8 wherein the first plastic component is a side wall for a step ladder and the second plastic component is a step for the step ladder.

10. The blow molded plastic interconnect apparatus of claim 9 further comprising a third plastic component that is identical to the first plastic component.

11. The blow molded plastic interconnect apparatus of claim 10 wherein the second plastic component has a third interconnect area and a fourth interconnect area wherein the top surface, the bottom surface, the first interconnect area, the second interconnect area, the third interconnect area and the fourth interconnect area are all one piece;

the third plastic component's receiving area receives the bottom surface, the third plastic component's first locking area receives the third connect area and the third plastic component's second locking area receives the fourth connect area;

the third connect area has a third driving expansion area having a third protruding conical shaped area separated from a fourth protruding conical shaped area by a second angled sloped area, the third driving expansion area extends from the bottom surface to the middle level, the middle level is positioned immediately below the third level when the third connect area and the third plastic component's first locking area are joined together, a third locking lower lip positioned at the middle level and positioned over portions of the third driving expansion area, a third step receiving area that extends from the third locking lower lip to the top surface;

the fourth connect area has a fourth driving expansion area, the fourth driving expansion area has a convex surface that slopes from the bottom surface to the middle level, the middle level is positioned immediately below the third level when the fourth connect area and the third plastic component's second locking area are joined together, a fourth locking lower lip positioned at the middle level and positioned over portions of the fourth driving expansion area, a fourth step receiving area that extends from the fourth locking lower lip to the top surface.

12. The blow molded plastic interconnect apparatus of claim 8 wherein the receiving area has a protuberance guide area and the bottom surface has a channel area wherein the channel area receives the protuberance guide area to ensure the first plastic component and the second plastic component are properly aligned.

13. The blow molded plastic interconnect apparatus of claim 8 wherein the top surface has furrows.

14. A blow molded plastic interconnect apparatus comprising:

A. a first plastic component having a first wall, a first locking area, a receiving area, the receiving area has a protuberance guide area, a second locking area, a second wall;

(a) the first wall, positioned at a first level, joins to the first locking area,
(b) the first locking area joins to the receiving area, the receiving area is positioned at a second level wherein the first level and the second levels are at different heights in relation to the ground,
(c) the receiving area joins to the second locking area and
(d) second locking area joins to the second wall, positioned at the first level, so the first wall, the first locking area, the receiving area, the second locking area and the second wall are one piece;

the first locking area has (i) a first expansion angled lip sloped at an angle away from the first wall toward the second level and terminates at a third level, the third level is positioned between the first level and the second level, (ii) a first locking upper lip positioned (a) at the third level and (b) under the expansion angled lip and a portion of the first wall, and (iii) a first receiving lip has a concave surface that slopes to the receiving area;

the second locking area has (i) a second expansion angled lip sloped at an angle away from the second wall toward the second level and terminates at the third level, the third level is positioned between the first level and the second level, (ii) a second locking upper lip positioned (a) at the third level and (b) under the second expansion angled lip and a portion of the second wall, and (iii) a second receiving lip has a concave surface that slopes to the receiving area;

B. a second plastic component having a top surface, a bottom surface, the bottom surface has a channel area, a first connect area and a second connect area which are all one piece;

the receiving area receives the bottom surface, the first locking area receives the first connect area, the second locking area receives the second connect area, and the channel area receives the protuberance guide area to ensure the first plastic component and the second plastic component are properly aligned;

the first connect area has a first driving expansion area having a first protruding conical shaped area separated from a second protruding conical shaped area by an angled sloped area, the first driving expansion area extends from the bottom surface to a middle level, the middle level is positioned immediately below and contacts the third level when the first connect area and the first locking area are joined together, a first locking lower lip positioned at the middle level and positioned over portions of the first driving expansion area, a first step receiving area extends from the second locking lower lip to the top surface;

the second connect area has a second driving expansion area, the second driving expansion area has a convex surface that slopes from the bottom surface to the middle level, the middle level is positioned immediately below and contacts the third level when the second connect area and the second locking area are joined together, a second locking lower lip positioned at the middle level and positioned over portions of the second driving expansion area, a second step receiving area that extends from the second locking lower lip to the top surface;

wherein the first plastic component and the second plastic component are combined together by (A) forcing (a) the second driving expansion area against the second expansion angled lip which forces the second expansion angled lip to uniformly move away from the first wall, (b) the first driving expansion area against the first expansion angled lip which forces the first expansion angled lip that contacts the protruding conical shaped areas to move further away from the second wall than the section of the first expansion angled lip that contacts the angled slope area, and (B) having the first expansion angled lip revert to its original position after the entire first driving expansion area passes the first expansion angled lip and the second expansion angled lip revert to its original position after the entire second driving expansion area passes the second expansion angled lip.

* * * * *